United States Patent [19]

Feistel et al.

[11] 4,080,181

[45] Mar. 21, 1978

[54] GAS GENERATOR

[75] Inventors: Paul Peter Feistel; Karl Heinrich Van Heek; Harald Jüntgen; Rainer Dürrfeld, all of Essen, Germany

[73] Assignee: Bergwerksverband GmbH, Essen, Germany

[21] Appl. No.: 739,820

[22] Filed: Nov. 8, 1976

[30] Foreign Application Priority Data

Nov. 6, 1975 Germany .............................. 2549784

[51] Int. Cl.² .............................................. C10B 1/06
[52] U.S. Cl. ..................................... 48/99; 23/288 L; 48/101; 48/120; 122/5; 165/104 F; 165/146; 201/31
[58] Field of Search ............... 48/99, 89, 101, 120, 48/202; 23/277 R, 288 L; 165/104 F, 146; 122/5, 235 C, 235 Q, 250 R, 421; 201/31

[56] References Cited

U.S. PATENT DOCUMENTS

| 2,055,549 | 9/1936 | Modine | 165/146 |
| 2,276,527 | 3/1942 | Throckmorton et al. | 165/146 |
| 2,619,415 | 11/1952 | Hemminger | 48/202 |
| 2,997,286 | 8/1961 | Friese | 122/4 D |
| 3,084,914 | 4/1963 | Davis | 165/146 |

Primary Examiner—Robert L. Lindsay, Jr.
Assistant Examiner—George C. Yeung
Attorney, Agent, or Firm—Michael J. Striker

[57] ABSTRACT

A gas generator is provided for the production of gas from fuel and steam under conditions of high pressure and temperature. The requisite temperature is preferably provided by a nuclear reactor. The gas generator includes a cylinder wth a hollow interior. Extending transversely through the hollow interior of the cylinder is a container. Tubular heat exchangers are vertically arranged over the length, width and height of the cylinder in such a manner that the density of heating surfaces decreases along the length of the container.

19 Claims, 5 Drawing Figures

GAS GENERATOR

BACKGROUND OF THE INVENTION

1. Field of the Invention

This invention relates to a gas generator, and, more particularly, to a gas generator for the gasification of finely-grained solid fuel. This invention is especially useful for the volatilization and carbonization of coal present in a fluidized bed.

2. Decription of the Prior Art

Conventional heat exchangers for this purpose have been densely distributed in a vertical and horizontal arrangement in order to supply a constant amount of heat to all parts of large-scale technological gas generators. However, the prior art incompletely utilized the constant supply of heat. The reason for this incomplete utilization is connected with the accumulation of free hydrogen in areas proximate to the vertically arranged parts of the heat exchangers. It has been experimentally determined that the speed of gasification is inversely proportionate to the partial pressure of hydrogen. Therefore, less heat of reaction is necessary in areas where free hydrogen has accumulated.

The gas generators of large-scale technology have a feeding end on one side, and a waste removal end on the other side. Less heat of reaction is required per unit volume of the horizontal fluidized bed as it progressively approaches the ash discharge outlet.

Two basic disadvantages of conventional apparatuses are the results of their structure. First, heat transfer per unit area of the heat exchanger is reduced in a vertical and horizontal direction. Second, the reduction in heat transfer leads to a higher temperature in both the vertical and horizontal directions. This temperature increase means that there is a disproportionate burden on the heat exchangers.

SUMMARY OF THE INVENTION

It is the primary object of the present invention to provide a gas generator for the gasification of solid fuel, and more particularly, a gas generator which avoids the disadvantages of conventional gas generators.

It is another object of the present invention to provide a gas generator which attains a constant fluidized bed temperature along the horizontal and vertical extent of the gas generator in order to maintain a preferable constant temperature in the gas generator.

By attaining an unvarying temperature in the gas generator, gasification capacity per unit volume of heat exchanger is boosted. Another advantage which flows from the present invention is in the form of cost-savings in material and assembly—because stress on the materials composing the gas generator is minimized. Therefore, along with the advantage of a longer useful life of the materials, is the advantage that a lower grade of material could be used.

The objects of the invention are accomplished by arranging heat exchange ducts over the length, width and height of the interior of the cylinder through which the container for solid fuel transversely extends. In such an arrangement, the density of heated surfaces is diminished from the feeding end in the direction of the ash discharge outlet, and from the floor of the container for solid fuel in a vertical direction.

The advantages of the present invention flow from the structure of the present invention. Over the constant cross-section or width of the container throughout the cylinder, the heat exchange ducts are spaced in a greater distance from series to series in the direction of the ash discharge outlet. As is shown by FIG. 1, the heat exchangers are arranged in an undulated series such that the spacing between the heat exchangers of each series increases in the direction of the ash discharge outlet.

The technological advantages of the present invention follow especially from the maintainance of the temperature in the fluidized bed over the length and heighth of the surface area of the gas generator. Therefore, lower grade materials can profitably be substituted in the construction of the heat exchange ducts, thus reducing the costs of raw materials for heat exchange ducts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
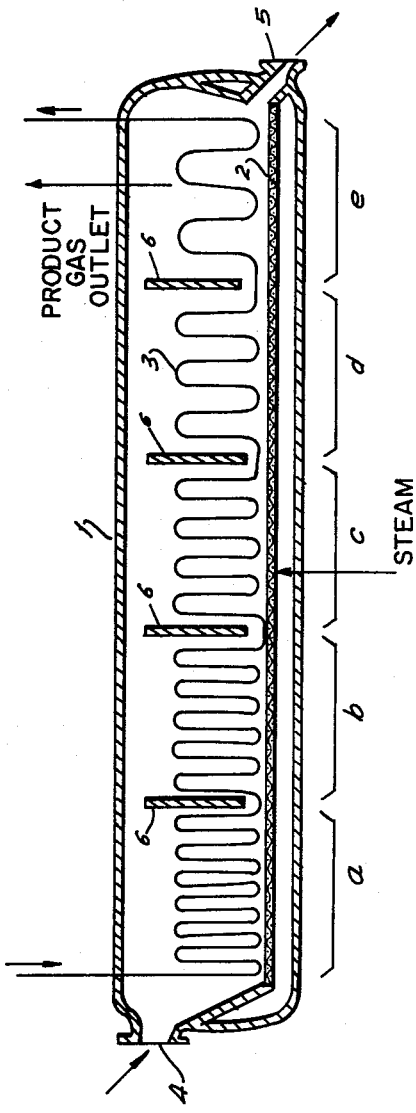
FIG. 1 is a side section view of the present invention.

FIG. 1 represents an embodiment of the present invention. A lengthwise extending cylindrical body forms the shell of the gas generator. Inside the interior 1 of the cylindrical body is a trough-like, perforated container 2. The container 2 is supplied with solid fuel, preferably coal, under pressure from the feeding inlet 4 which leads to the floor of the container 2. Steam inlets are not represented in FIG. 1. During the gasification process, the container 2 supports a fluidized bed made from coal and steam. Uniform temperature prevails over the length of the fluidized bed—from the feeding inlet 4 to the ash discharge outlet 5. The temperature remains uniform because of the undulated arrangement of the heat exchange ducts 3 along the length of the fluidized bed. The undulatingly arranged heat exchange ducts 3 gasify coal as it passes under pressure from the feeding inlet along the course of the container 2. The consequent heated residue is removed at the ash discharge outlet.

Because of the nature of this process, it follows that different temperatures will prevail with locally different gasification capacities. FIG. 1 shows a side section view of the undulated arrangement of the heat exchange ducts which are characterized by ever increasing spacings between the waves of the ducts 3 in the direction of the ash discharge outlet 5. The spacings may vary between entire groups of waves or undulations a–e as shown.

The purpose of the spacing and the consequent reduction in the density of heating surface area is to maintain a uniform temperature along the container 2 in the direction of the ash discharge outlet 5. Because this favorable distribution of the density of heating surfaces, the stress of variant temperature on the heat exchange ducts is minimized. Therefore, one can minimize the use of high-grade materials for construction of the heat exchange ducts. An additional advantage of increased useful longevity of the materials of the heat exchange ducts also follows from the application of the present invention.

As shown in FIG. 1, the dividers 6 separate the series of undulated portions of the heat exchanger. The purpose of the dividers 6 is to keep back mixing as low as possible and to improve the duration of the exposure of the solid fuel to heat radiation. In cases where a large-scale technological gas generator included a number of sections, it would be preferable to separate all individual sections from each othr by dividers 6.

The present invention can be used to gasify, for example, coal, lignite, peat, peat coke and shale oil. The extent of carbonization, i.e. distillation of volatilizable constituents from the coal, may be controlled by control of the temperature. The temperature preferably is at least sufficient to insure substantially complete vaporization of the fuel in the fluidized bed by the time it is discharged from the heating zone. The temperature of the heat exchanger portions near the feeding inlet 4 will be between 850° and 1050° C., with the exact temperature being dependent on the kind of material. Preferably, the temperature is maintained so that it is between 900 and 1000° C. The temperature of the fluidized bed depends on, among other things, the capability of the solid fuel to react. Therefore, the temperature of the fluidized bed lies within a range between 650° and 850° C. For example, it is preferable to maintain a fluidized bed temperature of about 780° C. for bituminous coal. It is preferable to maintain a fluidized bed temperature of about 680° C for lignite. In each case the temperature of the heated gases in the heat exchange should be about 900° C.

In the preferred embodiment illustrated by FIG. 1, five series of heat exchange sections 3 are separated by four mountings 6. The heat exchanger sections of each successive series are separated by a greater distance. In the preferred embodiment shown in FIG. 1, the undulations of the heat exchanger series $a$, which is closest to the feeding inlet 4 are separated by a distance of 68 mm. In the direction of the ash discharge outlet 5, successive series are separated by ever increasing distances. In Series $b$ the heat exchanger sections are separated by a distance of 85 mm; in Series $c$ by a distance of 102 mm; in Series $d$ by a distance of 119 mm; and in Series $e$ by a distance of 136 mm.

The temperature and pressure relationships affecting vaporization are well known. The gasification can be accomplished with a pressure inside the gas generator of between 1 and 100 dynes/cm$^2$. For the gasification of coal, it is preferable to maintain a pressure inside the gas generator of between 30 and 50 dynes/cm$^2$. The standard pressure at which the gas generator operates should be 40 dynes/cm$^2$.

The heat exchange ducts of the present invention are preferably constructed from alloys which have a high proportion of chromium and nickel along with a mixture of other elements such as Niobium and Titanium. Such alloys provide the best durability against corrosion and the best creep strength over a period of time at high temperature. An advantage of the present invention is that the temperatures involved in the gasification can be lowered and therefore, the stress against the heat exchange ducts is minimized. Because of the lower stress involved, a lower grade of alloy may be used in the construction of the heat exchange ducts. For example, an alloy with a smaller proportion of the more expensive metals can be used according to the present invention.

Passing through the heat exchange ducts is a heating medium which is gasiform. The heating may be a cooling gas of a high temperature reactor (for example, helium) or a flue gas from a boiler furnace.

Figure 3:
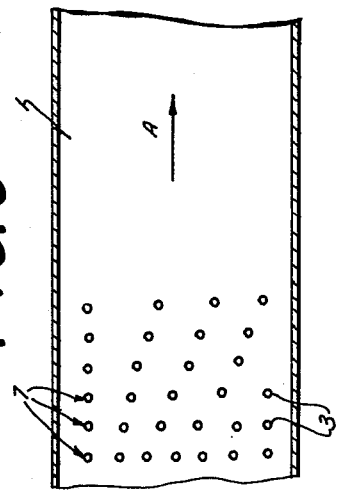
FIG. 3 is a second cutaway top view showing another embodiment of the present invention.
Figure 2:
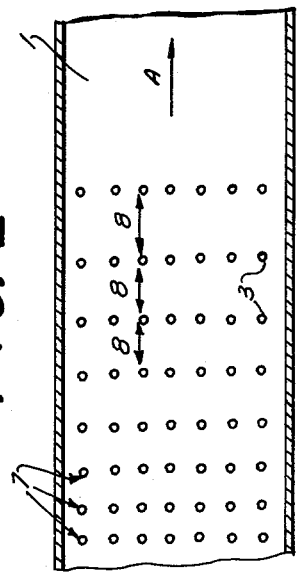
FIG. 2 is a cutaway top view showing one embodiment of the present invention.

In another embodiment of the present invention, the gas generator may be operated as a cohesive fluidized bed without the presence of mountings 6. A reason for dispensing with the mountings 6 is to reduce the distances between the undulations of the heat exchange duct. FIGS. 2 and 3 exemplifies embodiments in which mountings 6 are not provided. In thise cutaway top views of the presently invented gas generator, differing arrangements of the heat exchange ducts 3 are shown. In FIG. 2, the heat exchange ducts are arranged in a plurality of series 7, each of which is parallel to the width of the gas generator. The distance between the undulations in each parallel series increases in the direction of the arrow A, which represents the direction from the feeding inlet 4 towards the ash discharge outlet 5.

FIG. 3 illustrates another embodiment in which the distance between each series 7 of heat exchange ducts 3 is kept constant. Each series is arranged parallel to the width of the gas generator. While the distance along the length of the gas generator between each series is constant, the number of heat exchange ducts 3 per series 7 declines in the direction of the arrow A, which again represents the direction of the ash discharge outlet 5.

In order to minimize the production costs of the gas generator, the present invention could be embodied in a form in which continually varying distances or varying numbers of heat exchange ducts are not used. Instead, the gas generator is assembled out of sections, with each section provided with a constant density of heating surfaces. The resultant constant temperature of the fluidized bed is comparable to that obtained by the preferred embodiment, in which the distance between each series is ever increasing in the direction of the ash discharge outlet 5.

Figure 4:
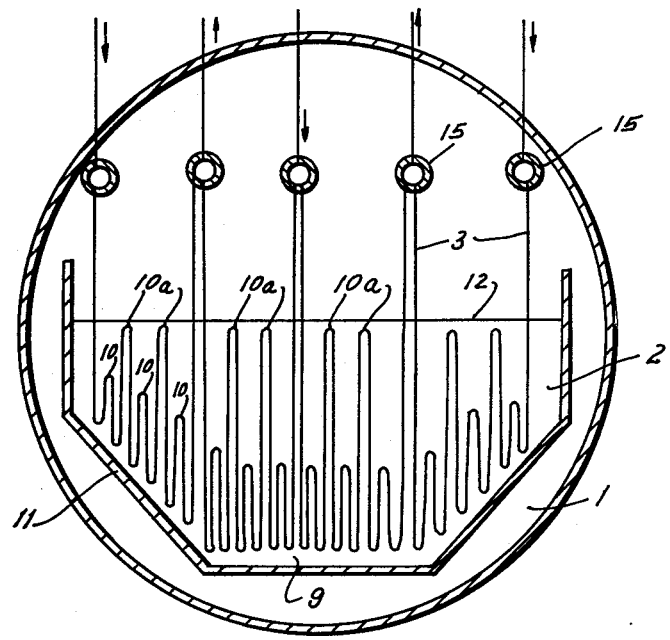
FIG. 4 is a cross-sectional view showing one embodiment of the present invention.
Figure 5:
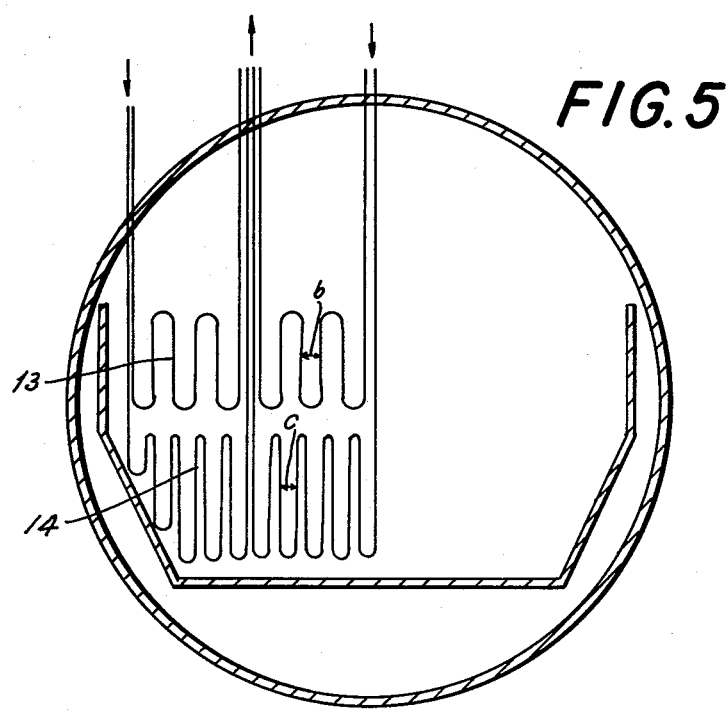
FIG. 5 is a cross-sectional view showing another embodiment of the present invention.

FIGS. 4 and 5 illustrate embodiments in which a section of the cylindrical gas generator is shown in which the heat varies along the height of the gas generator. These arrangements have been made in order to profitably benefit from the free flow of hydrogen in a vertical direction above the container 2. This area of hydrogen accumulation is the pacifying region. Since the rate of reaction in this area diminishes in proportion to the partial pressure of hyrogen with this embodiment, the free hydrogen component of the gas can be increased above the fluidized bed. The avantage of this increase of the hydrogen component is that the consumption of heat due to the steam gasification is restrained while the heat-generation due to hydrogen formation is promoted. The collective result is that heat requirements are decreased. The decreased heat requirements can be taken into account by a decreased density of heating surfaces.

The heat exchange ducts 3 are undulatingly arranged along the interior 9 of the container 2. In FIG. 4 collecting ducts 15 are arranged along the entire width of the container above the interior 9 of the container 2. The heat exchangers 3 are arranged like those shown in FIGS. 1-3—in a parallel arrangement. The undulated heat exchangers are alternately bent in such a manner that alternate heat exchanger 10a is proximate to the upper edge 12 of the container 2 while heat exchanger 10 is closer to the floor of the interior 9 of the container 2. This form of undulation of the heat exchangers 3 permit the decrease of the density of the heating surfaces in the gas pacifying regions above the container 2.

The embodiment shown in FIG. 5 shows the heat exchange ducts arranged such that one undulated heat exchanger is above another heat exchanger. The only difference between the upper undulated heat exchangers and the lower ones is the distance of separation of the heat exchangers. The distance $b$ which separates the upper heat exchangers is greater than the distance $c$ which separates the lower heat exchangers. Because of this arrangement, the density of heating surfaces can be decreased in the upper regions of the interior of the container. Therefore, this arrangement can profitably utilize the phenomenon which follows from hydrogen accumulation in these upper regions.

It will be understood that each of the elements described above, or two or more together, may also find a useful application in other types of constructions differing from the types described above.

While the invention has been illustrated and described as embodied in a gas generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A gas generator for the production of gas under conditions of high temperature and pressure from a fluidized bed of particulate fuel, comprising in combination, a vessel having hollow interior; spaced-apart inlet and outlet means for the particulate fuel; means for admitting steam into said hollow interior to form therein a fluidized bed of the particulate fuel wherein the fuel particles travel from said inlet means to said outlet means under concomitant production of a product gas, said fluidized bed having a temperature gradient increasing in the direction towards said outlet means; means for removing product gas from said hollow interior; and means for counteracting said temperature gradient so as to maintain the fluidized bed at a constant temperature intermediate said inlet means and said outlet means, said temperature-maintaining means comprising tubular heat exchanger means having a collective heat exchanging surface area extending substantially throughout the length, width and height of said vessel, the proportion of the surface area which is located in the region closer to said outlet means to the total surface area being smaller than the proportion of the surface area which is located in the region closer to said inlet means so that the differential heat-exchange resulting from these relative proportions compensates for the increase in the temperature gradient in direction towards said outlet means.

2. A gas generator as recited in claim 1, said heat exchanger means also having a smaller proportion of total surface area located in upper portions of the height of said vessel than in lower portions of the height of said vessel so as to compensate for heat produced from exothermic hydrogen generation in product gas rising to the upper portions.

3. A gas generator as recited in claim 1, said heat exchanger being in part above the fluidized bed and containing heated gases which maintain a temperature within the range of about 850°–1050° C in the heat exchanging surface area close to said inlet means for the particulate fuel.

4. A gas generator as recited in claim 1, said heat exchanger means containing heated gases having a temperature of about 900° C so as to maintain said fluidized bed at a temperature within the range of 650°–850° C.

5. A gas generator as recited in claim 1, said heat exchanger means being arranged in a plurality of series, each of which extends across the direction of travel of the fuel particles from said inlet means to said outlet means, the proportion of total surface area of said heat exchanger means of each series successively decreasing in direction towards said outlet means.

6. A gas generator as recited in claim 1, said heat exchanger means being arranged in a plurality of series, each of which has a length which extends along the direction of travel of the fuel particles from said inlet means to said outlet means, the proportion of total surface area of said heat exchanger means successively decreasing along the length of each series in direction towards said outlet means.

7. A gas generator as recited in claim 1, wherein the surface area of said heat exchanger means decreases along the length of said vessel.

8. A gas generator as recited in claim 7, said heat exchanger means being arranged in a plurality of series of undulations, each series extending parallel to the width of said vessel.

9. A gas generator as recited in claim 8, each series of said heat exchanger means being increasingly spaced from each other in direction of said outlet means while the spacing between the undulations of each series is constant.

10. A gas generator as recited in claim 1, wherein the surface area decreases across the width of said vessel in the direction of said outlet means.

11. A gas generator as recited in claim 10, said heat exchanger means being arranged in a plurality of series of undulations, each series extending parallel to the width of said vessel and being successively located along the direction of travel of the fuel particles.

12. A gas generator as recited in claim 1, said fluidized bed passing in a horizontal direction from said inlet means to said outlet means.

13. A gas generator as recited in claim 7, wherein said heat exchanger means extends parallel to the length of said vessel and is arranged as a series of undulations.

14. A gas generator as recited in claim 13, wherein spacing between each undulation increases from series to series in the direction towards said outlet means of said vessel.

15. A gas generator as recited in claim 14, further comprising a plurality of dividers, each of which demarcates a series of uniform spacing within said heat exchanger means.

16. A gas generator as recited in claim 11, wherein spacing between undulations continually increases in the direction of said outlet means while spacing between each series remains constant.

17. A gas generator for the production of gas under conditions of high temperature and pressure from a fluidized bed of particulate fuel, comprising in combination, a vessel having a hollow interior; spaced-apart inlet and outlet means for the particulate fuel; means for admitting steam into said hollow interior to form therein a fluidized bed of particulate fuel wherein the fuel particles travel from said inlet means to said outlet means under concomitant pressure of a product gas, said fluidized bed having a temperature gradient in direction increasing towards said outlet means; means for removing product gas from said hollow interior; and means for counteracting said temperature gradient so as to maintain the fluidized bed at a constant temperature intermediate said inlet means and said outlet means, said temperature-maintaining means comprising tubular heat exchanger means having a collective heat exchanging surface area extending substantially throughout the length, width and height of said vessel, the proportion of the total surface area which is located in upper portions of the height of said vessel being smaller than the porportion of the total surface area located in lower portions of the height of said vessel so as to compensate for heat produced from exothermic hydrogen generation in product gas rising to the upper portions.

18. A gas generator as recited in claim 17, wherein said heat exchanger means are alternately bent in such a manner that low and heightened surface areas alternate with each other.

19. A gas generator as recited in claim 17, wherein heat exchanger means are arranged in a series of undulations and are superimposed over one another in such a manner that spacing between undulations of the upper series is greater than spacing between undulations of the lower series.

* * * * *